(12) United States Patent
Ragland et al.

(10) Patent No.: US 6,276,044 B1
(45) Date of Patent: Aug. 21, 2001

(54) SHAPED MULTILAYER METAL FOIL SHIELD STRUCTURES AND METHOD OF MAKING

(75) Inventors: Raymond E. Ragland, Union; Robert S. Timmerberg, St. Louis, both of MO (US); Christopher V. Ragland, Duluth, GA (US); Matthew S. Remke, Atlanta, GA (US); Stephen J. Fairchild, Roswell, GA (US); G. William Ragland, Dunwoody, GA (US)

(73) Assignee: ATD Corporation, Norcross, GA (US)

( * ) Notice: Subject to any disclaimer, the term of this patent is extended or adjusted under 35 U.S.C. 154(b) by 0 days.

(21) Appl. No.: 09/092,631

(22) Filed: Jun. 5, 1998

Related U.S. Application Data (63) Continuation-in-part of application No. 08/871,275, filed on Jun. 9, 1997, now Pat. No. 5,958,603.
(60) Provisional application No. 60/069,480, filed on Dec. 15, 1997.

(51) Int. Cl.[7] ............ B21D 13/00; B21D 22/00; B21D 31/00; B21D 39/02
(52) U.S. Cl. .................................. 29/521; 72/363
(58) Field of Search .................. 428/594, 593, 428/603, 604, 595; 72/379.2, 379.6, 363; 181/290, 291; 29/17.4, 430, 505, 521

(56) References Cited

U.S. PATENT DOCUMENTS

| | | | |
|---|---|---|---|
| 1,934,174 | 11/1933 | Dyckerhoff | 154/28 |
| 1,987,798 | 1/1935 | Ruppricht | 154/45 |
| 2,045,733 | 6/1936 | Spafford | 154/45 |
| 2,180,373 | 11/1939 | Sibley et al. | 189/34 |
| 2,466,859 | 4/1949 | Northrup | 126/19 |
| 3,152,033 | 10/1964 | Black et al. | 161/50 |
| 3,354,021 | 11/1967 | Royet | 161/111 |
| 3,509,990 | 5/1970 | Piazze | 206/57 |
| 3,801,419 | 4/1974 | Meek | 161/44 |
| 3,966,646 | 6/1976 | Noakes et al. | 252/477 |
| 3,981,689 | 9/1976 | Trelease | 29/183 |
| 4,074,495 | 2/1978 | Bodnar | 52/613 |
| 4,099,928 | 7/1978 | Norback | 29/157 |

(List continued on next page.)

FOREIGN PATENT DOCUMENTS

| | | |
|---|---|---|
| 1972-2049 | 12/1971 | (JP) . |
| 1973-00209 | 6/1973 | (JP) . |
| 1981-187651 | 12/1981 | (JP) . |
| 1987-37518 | 3/1987 | (JP) . |

Primary Examiner—John J. Zimmerman
(74) Attorney, Agent, or Firm—Burns, Doane, Swecker & Mathis, LLP (57) ABSTRACT

A forge/swage formed three dimensional multilayer metal foil shield having areas therein where the layers are in a spaced apart relationship, areas therein where the layers are tensioned or stretched, and areas therein where the layers are compressed and interlocked together by folding, rolling, wrinkling, curling, coiling, crimping and the like. The multilayer metal foil shield is formed by forge/swage shaping in an appropriate mold apparatus a preform of a stack of metal foil layers having gaps between the layers. The gaps are provided by embossments in the layers or by spacers between the layers. The forge formed multilayer metal foil shields have utility as heat shields and acoustic shields, particularly on vehicles. The forge formed multilayer metal foil shields are mounted on automobile underbody areas, such as the bottom of the floor pan of the passenger compartment, to provide heat and sound insulation. Other automotive uses include fire wall, exhaust tunnel, motor mount and exhaust down pipe. The three dimensional shields include multilayer metal sheet formed structures. Intermediate beaded or rolled edge multilayer metal preforms are made for transport to the final three dimensional stamping operation.

10 Claims, 5 Drawing Sheets

U.S. PATENT DOCUMENTS

| | | | |
|---|---|---|---|
| 4,251,598 | 2/1981 | Waite | 428/603 |
| 4,337,565 | 7/1982 | Diana | 29/509 |
| 4,394,410 | 7/1983 | Oarow et al. | 428/43 |
| 4,559,205 | 12/1985 | Hood | 422/180 |
| 4,576,800 | 3/1986 | Retallick | 422/180 |
| 4,687,697 | 8/1987 | Cambo et al. | 428/201 |
| 4,794,052 | 12/1988 | Morrison | 428/595 |
| 4,810,588 | 3/1989 | Bullock et al. | 428/603 |
| 4,971,216 | 11/1990 | Fortune | 220/94 |
| 5,011,743 | 4/1991 | Sheridan et al. | 428/600 |
| 5,029,721 | 7/1991 | Timpe | 220/94 |
| 5,030,302 | 7/1991 | Jud et al. | 156/164 |
| 5,158,814 | 10/1992 | Foti | 428/592 |
| 5,196,253 | 3/1993 | Mueller et al. | 428/138 |
| 5,385,790 | 1/1995 | Atkinson et al. | 428/593 |
| 5,408,071 | 4/1995 | Ragland et al. | 219/530 |
| 5,424,139 | 6/1995 | Shuler et al. | 428/596 |
| 5,503,062 | 4/1996 | Buff, IV | 99/426 |
| 5,524,406 | 6/1996 | Ragland | 52/406.2 |
| 5,582,389 | 12/1996 | Greene | 249/61 |
| 5,633,064 | 5/1997 | Ragland et al. | 428/95 |
| 5,670,264 | 9/1997 | Sheridan | 428/594 |
| 5,958,603 * | 9/1999 | Ragland et al. | 428/595 |

* cited by examiner

FIG_1

FIG_2

FIG_3A

FIG_3B

FIG_6

FIG_4A

FIG_4B

FIG_4C

FIG_4D

FIG_5A

FIG_5B       FIG_5C

FIG_5D  FIG_5E  FIG_5F

FIG_7A

FIG_7B

FIG_7C

SHAPED MULTILAYER METAL FOIL SHIELD STRUCTURES AND METHOD OF MAKING

This application claims priority and a C-I-P under 35 U.S.C. §§119 and/or 365 to Ser. No. 08/871,275 filed in U.S. on Jun. 9, 1997 now U.S. Pat. No. 5,958,603 and 60/069,480 filed in U.S. on Dec. 15, 1997 the entire contents of which are hereby incorporated by reference.

FIELD OF THE INVENTION

This invention relates to multilayer metal foil shields which have utility as heat shields and as acoustic shields.

BACKGROUND OF THE INVENTION

Multilayer metal foil insulation has been used for many years, as illustrated by U.S. Pat. No. 1,934,174. Such metal foil insulation has typically been used in high temperature applications for reflective heat insulation. In those applications, the layers of metal foils are embossed to provide separation between the layers, and the stack of layers are protected in a container or rigid cover to prevent the stack of metal foils from becoming compressed at any portion, which would decrease the heat insulation value of the stack.

U.S. Pat. No. 5,011,743, discloses that multilayer metal foil insulation can provide enhanced performance as a heat shield when a portion of the multilayer metal foil is compressed to provide a heat sink area through which heat is collected from the insulating portions of the stack and dissipated from the heat shield. Such multilayer metal foil heat shields are formed from a stack of embossed metal foil layers by compressing portions of the stack to create the desired heat sink areas. The layers are attached to each other or stapled together to prevent the layers from separating. The heat shields and acoustic shields formed according to the disclosure of the U.S. Pat. No. 5,011,743 are typically compressed in the heat sink areas and cut to a desired pattern. Such multilayer metal foil heat shields do not normally have sufficient structural strength for stand-alone use in many applications. For many applications, the metal foil heat shields are typically attached to a structural support member or pan to provide a final assembly which is then placed in service as a heat shield or acoustic shield. The support members are typically metal pans or stampings or metal castings. Typical applications for such heat shield assemblies include automotive heat shield applications.

The disclosures of the above patents are incorporated herein by reference.

SUMMARY OF THE INVENTION

It is an object of this invention to provide a multilayer metal foil insulation structure which has sufficient structural strength to function as a stand alone unitary heat shield or acoustical shield without the necessity of the multilayer metal foil insulation being preassembled on a support member.

The multilayer metal foil structures of this invention comprise at least three metal layers at least two of which are metal foil layers having a thickness of 0.006 in. (0.15 mm) or less. It is generally preferred that the structures of this invention contain at least three layers of metal foil and more preferably will typically contain five to seven layers of metal foil. Preferably, the metal foil layers will be 0.005 in. (0.12 mm) or less with 0.002 in. (0.05 mm) metal foil being a preferred thickness for interior layers in many shield applications. In addition to the layers of metal foil, optional protective exterior layers of metal sheet on one or both sides of the shield structure can be included. The metal sheets have a thickness greater than 0.006 in. (0.15 mm) and up to about 0.050 in. (1.27 mm). The thickness of the optional exterior protective metal sheet is selected such that it can be formed and shaped as part of the unitary multilayer metal foil shield structure according to this invention. Preferably the protective exterior metal sheet layers will be between about 0.008 in. (0.20 mm) and about 0.030 in. (0.76 mm). In the multilayer metal foil structures of this invention, one or more layers of such metal sheets may be placed between the metal foil layers, if desired, for additional structural strength of the final unitary multilayer metal foil shield structure. For some shield applications the multilayer metal foil structure can be made entirely of metal foils having a thickness of 0.006 in. or less, without the use of any thicker metal sheet layers. The multilayer metal foil structures have surprising structural strength and rigidity when forge formed according to this invention.

The multilayer metal foil shield structures according to this invention are shaped by a forming process which includes providing a preform of at least three layers of metal sheet, at least two of which layers are metal foil layers having a thickness of 0.006 in. (0.15 mm) or less, where the layers are spaced apart to provide gaps between the layers, forming the multilayer preform over a shaping mold whereby a first portion of the preform is held in position to maintain the spaced apart positions to maintain desired gaps between the layers, a second portion of the preform is placed under tensile stress to shape that second portion of the preform into ridges or corners to form the desired three dimensional form and a third portion of the preform is placed under compression to shape that third portion of the preform into a wall section positioned at an angle from the plane of the first portion and an edge section to interlock the layers together in that third portion. The second portion provides the transition from the first portion having spaced apart layers and the third portion having compressed, interlocked layers. The third portion comprises a wall section and an edge section. It is preferred that the layers be compressed and interlocked together in both the wall section and the edge section. However, in some configurations of the structures of this invention, the layers may be compressed and shaped to form the wall section, but the layers are not interlocked together in part or all of the wall section. But in such configurations, the layers are always compressed and interlocked together in the edge section where the layers are preferably folded, curled or rolled together at the edge to form a bead along the edge of the structure. The compressed portion provides three dimensional shape of the structure and imparts structural strength to the overall multilayer metal foil structure by folding or wrinkling the sheets of the preform into interlocking relationship in the third portion to form a unitary rigid multilayer metal foil structure. The forming operation, which simultaneously stretches the second portion and compresses the third portion of the multilayer metal foil preform into the final multilayer metal foil structure, imparts three dimensional rigidity and structural strength to the final formed multilayer metal foil structure, while also maintaining the spaced apart layers and the gaps between the layers in the first portion of the preform. The forming operation also interlocks the layers at an edge portion of the structure preferably by folding, curling or rolling the edge, e.g., forming a cylindrical bead along the edge of the multilayer structure.

The present invention provides a formed metal structure comprising at least three layers of metal sheet, at least two of which layers ire metal foil layers having a thickness 0.006 in. (0.15 mm) or less, formed into a three dimensional unitary structure whereby in a portion of the structure the layers have gaps therebetween provided by spacers to hold the layers apart and in a portion of the structure the layers are interlocked and folded together to substantially eliminate gaps between the layers thereby providing the three dimensional structural strength of the final part. The multilayer metal foil structure is three dimensionally formed from a preform of a stack of said metal layers over a mold whereby portions of the layers are shaped under tensile stress and portions of the layers are shaped under compressive conditions to form the metal foil layers into interlocking folds, wrinkles or rolls, while portions of the layers are maintained in spaced apart relationship with gaps between the layers.

This invention provides multilayer metal foil structures which are free standing, three dimensionally stable or rigid structures, which may be assembled or installed as stand-alone products for heat shield or acoustical shield uses, particularly in automotive applications, without the requirement of a support pan, stamping, frame or other structural support member for the shield.

The present invention provides a method of forming a multilayer metal structure by providing a multilayer preform of a stack of at least three layers of metal sheet at least two of which layers are metal foil each having a thickness of 0.006 in. (0.15 mm) or less where the layers have gaps therebetween, and forming said multilayer preform over a rigid mold whereby in a portion of the preform the layers are maintained with gaps therebetween, in a portion of the preform the layers are placed under tensile stress to shape that portion of the preform into ridges or corners to form the desired three dimensional shape and in a portion of the preform the layers are placed under compression to shape a portion of the preform into a three dimensional shape to impart structural strength to the metal structure by substantially eliminating the gaps between the layers and by interlocking the layers together in that portion of the preform to form a multilayer metal foil unitary structure.

The present invention further provides the formed and shaped multilayer metal structure as described above wherein the layers comprise three metal sheets each having a thickness greater than 0.006 in. (0.15 mm). Similarly, the present invention provides the method as described above for forming and shaping multilayer metal structures from a multilayer preform wherein the layers comprise three metal sheets each having a thickness greater than 0.006 in. (0.15 mm). It is preferred in these aspects of this invention that the preform and the resulting formed and shaped structure comprise four to nine or more layers, while five to seven layers are preferred for many heat and sound shield applications.

In one most preferred aspect of this invention, multilayer metal sheet shield parts having three, four, five or more layers are formed from multilayer metal sheet preforms by a single stroke stamping operation which forms the multilayer preform into a three dimensional rigid shaped structure in which a portion of the final part has the layers in a spaced apart relationship, a portion of the part has at least some of the layers stretched or tensioned around corners or ridges shaped in the part, and a portion of the part has the layers compressed vertically and longitudinally and/or laterally and interlocked together, preferably in a curled, rolled or folded bead along one or more edges of the part. The shaping and interlocking the layers together in a single stamping stroke provides a very efficient method of making multilayer metal heat and acoustic shields to fit any desired end use application. In another most preferred aspect, at least one, and preferably two, three or more, layers of the single stroke stamped part is metal foil sheet having thickness of 0.006 in. or less, e.g., 0.005 in., 0.002 in., and 0.0008 in. The single stroke stamping operation can also include stamping into the part attach points or reinforced bolt or screw holes for assembling the part on its final intended use location, such as on a vehicle.

In another practice of the above preferred aspect of the invention, it may be desirable to first form the curled, rolled or folded bead along one or more edges of the multilayer metal preform before subjecting the preform to the single stroke stamping operation to form the final three dimensional rigid multilayer metal shield. In this practice of the invention the selected number of metal sheets are stacked and trimmed to the desired engineered shield shape then stamped to form the curled, rolled or folded bead along the edges to form a unitary multilayer metal beaded preform. The beaded preform is substantially flat in overall shape but contains areas in the shape where the layers are in the spaced apart relationship and edge areas where the layers are curled, rolled or folded into a bead. In forming this flat beaded preform the stack need not be trimmed before stamping. The initial stamping of the stack can perform the trimming to shape, forming the edge beads and punching, compressing or otherwise forming as many final or near final features desired in the final shaped shield, such as attach points, openings for fitting with other parts in the final assembly, e.g., on a vehicle. The substantially flat (or other desired preliminary shape) multilayer metal beaded preforms are then efficiently transported (due to minimal volume) to the final assembly location where they are then stamped into the final three dimensional structural shield shape desired for the final engineered part. The final stamping operation can merely provide shaping to the three dimensional shape by compressing some areas stretching or tensioning some areas while maintaining the spaced apart relationship of the layers in a portion of the part, or can also provide additional punching, cutting or other operation to form the final desired engineered part.

In another aspect of this invention fibrous, plastic, resin or other non-metal materials are encapsulated between two or more layers of the multilayer metal sheet structure. The non-metallic materials are preferably scaled in the structure by the entire edge and any internal edges being curled, rolled or folded bead to seal the materials between the layers. The non-metallic materials can extend into the bead edge area and be curled, rolled or folded along with the metal sheet layers, or those materials can be trimmed to fit up to but short of the bead.

DESCRIPTION OF THE INVENTION

This invention employs a metal shaping process to provide novel multilayer metal foil structures. Conventional processes for metal forming or stamping operations involve the compression shaping of a single metal member or a solid metal preform to provide a final metal article. According to the present invention, the preform is multiple metal foil layers provided with spacers which provide gaps between the layers. Conventional metal shaping and forming, such as, forging, is usually preformed with heat or a heated preform, but cold forming, forging or swaging is also conventionally used on solid metal parts. This invention provides forge-like or swage-like processes which have been adapted and modified to provide processes as disclosed herein to produce the formed multilayer metal foil structures of this invention. Heating or heated preform may be used, but is not necessary in the process of the present invention, which is preferred to be carried out at ambient temperatures. The process employed in forming the multilayer metal foil structures disclosed herein included adapted processes similar to stamping, hydroforming and the like.

In the processes of this invention a multilayer metal foil preform having gaps between the layers is subjected to a forming or stamping operation somewhat similar to cold forging or swaging to provide a resulting rigid metal structure which is a multilayer metal foil structure formed into a three dimensional part in which has three distinct portions in the final structure. In a first portion of the structure the preform layers have been placed under tensile stress conditions during the shaping process to flatten or stretch that portion of the metal foil layers, such as around corners, ridges or protrusions in the final part. Another second portion of the structure has been subjected to compressive conditions and forces during the shaping process to form that portion of the metal foil layers into folds, rolls, wrinkles, curls or other configuration which interlocks the layers together and gives the layers a desired degree of rigidity and three dimensional structural strength. In this second portion of the structure, the compression is vertical, i.e., normal to the plane of the layers, as well as compression longitudinally and/or laterally, substantially along the plane of the layers to wrinkle, fold or otherwise interlock the layers together into a unitary rigid structure. In this second portion of the structure it is further preferred to curl, fold, roll or otherwise interlock the metal layers together, preferably at the edge of the part. In another third portion of the structure, the layers are neither significantly stretched nor compressed so that the gaps between the metal foil layers are substantially maintained. Thus, it will be recognized by one skilled in the art following the disclosure herein that the molds used in forming and shaping the multilayer metal foil preform can be constructed so that when the part is formed a first portion of the multilayer metal foil preform is tensioned or stretched, a second portion of the multilayer metal foil preform is shaped by compressing the metal foil layers together so that the layers are interlocked together by folding, rolling, wrinkling, curling, coiling, crimping, etc. and a third portion of the multilayer metal foil preform remains substantially neutral, i.e., the third portion is neither stressed nor compressed, where the preexisting gaps between the layers in the preform remain between the metal foil layers in the final formed part. In the second portion, the compression preferably includes longitudinal compression to wrinkle, fold or otherwise interlock the layers together into a unitary structure.

The gaps between the metal foil layers are provided by spacers which hold the layers a desired spaced apart relationship to form the desired gaps and distance between the layers, depending on the heat and/or acoustic shielding properties desired in the final shaped and formed multilayer metal shield. The spacers can be in the form of embossments, corrugations or other deformations in at least one of the metal foil layers, including dimpling, wrinkling, crinkling, and the like. Such deformations are preferred because they can easily be collapsed, stretched, flattened, etc. during the part forming and shaping process of this invention, which deformations facilitate the forming and shaping of the multilayer metal foil preform into the rigid unitary structures of this invention. In addition, the spacers providing the gaps between the layers can be metallic or other spacer elements or materials, such as metal foil pieces or metal foil mesh, which can be compressed as desired in the areas where the layers are to be compressed and interlocked together, or the spacers can be non-compressible pieces, spheres, rods, etc. in the areas where it is desired to have gaps between the layers.

During multilayer metal forming and shaping method according to this invention, the multilayer metal foil preform is compressed onto a mold or is compressed between two substantially rigid forge molds to shape the multilayer metal foil preform into the desired final interlocked structure and three dimensional shape. The forming and shaping processes of this invention are intended to include hot or cold shaping and forming of the multilayer metal foil preform. In the forming process, a portion of the preform will be subjected to tensile stressing or stretching which may range from slight to somewhat extreme tensile stress. The tensile stress usually occurs at the corners, elbows or other contours and shapes of the structure, especially convex shapes, where the layers transition from one plane or contour to another. Under slight tensile stressing in those areas, one or more of the metal foil sheets, which have been pre-embossed, corrugated, wrinkled or otherwise deformed or shaped to provide gaps between the layers may be flattened or stretched to a smooth condition such that all or a portion of any embossments, corrugation, dimpling or crinkling originally present in the multilayer metal foil preform in that area may be partially or completely smoothed under the tensile stressing or stretching conditions present in that particular area of the preform when the preform is subjected to the shaping and molding process. Under more extreme tensile stressing or stretching conditions resulting from a particular configuration of a multilayer metal foil part being formed or molded, one or more of the layers of metal foil may actually be subjected to elongation to facilitate the forming of the final desired three dimensional multilayer metal foil structure. Care should be taken to select and design the layers in the preform and the forming/shaping/molding for a particular desired structure to prevent excessive tearing or ripping any of the metal foil layers in the portion subjected to tensile stressing or stretching. For example, in extreme contour of parts, the preform may need to contain metal foil layers having extra heavy deformations, such as corrugations, embossments or crinkling, to allow shaping of the part by stretching out or flattening those deformations in the mold without tearing or ripping the foil layer in the tensioned portions of the shaped part. While some tearing or ripping of internal layers in the stack of metal sheets can be tolerated for some shield applications of the metal foil structures of this invention it is preferred not to have discontinuous layers, especially the external layers.

The shaping or molding of the multilayer metal foil preform can be done by pressing the preform between two rigid molds, pulling or pushing the preform onto a single male mold, or pushing the preform into a single female mold. The shaping or forming on or in a single mold can be done by clamping the edges of the preform and pulling, or by pressing with a resilient member, such as a rubber form of appropriate hardness and shape. The appropriate mold shape and material can be selected by one skilled in the art following this disclosure to appropriately enable the preform to conform to the desired mold and to form the desired folds or wrinkles in selected wall portions of the final forge formed part, thereby providing the desired three dimensional structural strength in the final formed part. Similarly, the interlocking of the metal foil layers may be by folding, wrinkling, curling, coiling or rolling the layers together to provide the desired unitary three dimensional structure being formed. For example, for some parts it may be desirable to compression fold, curl, or roll the edges, or at least one edge, of the multilayer metal foil preform into a cylindrical or other shaped roll or bead to interlock the layers before forming the part. Such folding or rolling the layers into a cylindrical or bead shape can be at an interval area or portion of the part to interlock the layers together, i.e., it need not necessarily be at an edge of the finished part. For other parts it will be desirable to form the part first, trim the flash or waste at the edges, then fold or curl the edges of the shaped multilayer preform to finish the interlocking of the layers for structural strength. In forming some multilayer metal foil parts it will be desired to fold or wrinkle a central or interior portion of the multilayer preform to both provide the desired shape and the desired interlocking of the layers for three dimensional structural strength for the part. In such a part the edges can also be folded, coiled or rolled, e.g., into a cylindrical roll, to provide additional structural strength, or one or more edges can be left uncompressed as part of the portion of the structure where the gaps between the metal foil layers are maintained. In some parts it may be desired to provide a wire or other member around which the metal layers are folded, coiled or rolled into a cylindrical shape. The wire or other reinforcing member can provide additional strength or structural rigidity to the finished part or can be integrated with attach points for mounting the part on, e.g., a vehicle.

As will be apparent from the teachings herein, it will frequently be desired that the space between certain areas of two-part rigid forming molds, when closed, will form a mold cavity having an opening about equal to the initial total thickness of the multilayer metal foil preform, whereby during the forming and shaping process the metal foil layers in those areas of the preform are neither tensile stressed nor compressed. Those areas merely remain in the original preform thickness or dimensions and spaced apart layers, thereby maintaining the original gaps between the layers. It will be recognized that it is these areas, in conjunction with other portions or areas of the preform, which are not subjected to substantial or complete compression, that provide a majority of the heat and sound insulating properties of the multilayer metal foil structures formed according to this invention. And, the areas wherein the metal foil layers are contoured, stretched, compressed and/or interlocked together are the areas that provide a majority of the structural strength of the shaped and formed multilayer metal foil shield.

In the portion of the preform which is subjected to compression to form the interlocking of the multiple layers and to form the unitary, multilayer metal foil structure provided by this invention, the compression in the appropriate portions of the preform is designed to result in the interlocking the multiple metal foil layers together by folding, wrinkling, curling, coiling or rolling the layers to form, e.g., a cylindrical roll preferably at an edge of the structure. The compression of the metal foil layers to form the interlocking layers, specialty by wrinkling (which is frequently repeating small folds of the layers in a regular or irregular pattern) the compression of the multilayer preform is preferably in the longitudinal and/or transverse direction as well as the vertical direction where vertical is normal (z direction) to the plane of the layers and longitudinal or transverse is along the plane of the layers (x or y direction). Compression of the layers vertically tends to reduce or eliminate the gaps between the layers. Compression of the layers longitudinally or transversely provides a gathering or pleating of excess and overlapping metal foil material that can fold or wrinkle the layers over each other, thereby enabling the layers to become interlocked when the final compression including vertical compression, of those portions of the structure is accomplished. In these interlocked portions of the structure, the spacers providing the gaps between the layers will be at least partially if not completely eliminated or compressed so that the layers have essentially no gaps between them in these compressed, interlocked portions of the final shield part. While these portions of the structure may have diminished thermal and acoustical insulation performance, it is these portions of the multilayer metal foil structure which impart the unitary structural strength to the final shaped multilayer metal structure. Following the method and teaching of this invention, such unitary multilayer metal foil structures containing metal foil layers of 0.006 in (0.15 mm) thickness or less are easily designed with or without one or more protective outer metal layers or sheets which are thicker than about 0.007 in. (0.18 mm) and can be designed as a complete shield part with mounting hardware or attaching mechanisms. The shaped and formed multilayer metal foil structures of this invention thereby can be used directly in the desired application, such as a automotive heat or acoustic shield, without the need for a supporting structural stamping, pan or frame member.

As will be further apparent from the teachings herein the multilayer metal preform can first be formed into a preliminary beaded preform which is substantially flat or other desired shape for efficient transport to a final forging or shaping operation for making the final multilayer metal three dimensional engineered part. In this practice of the invention the selected number of metal sheets are stacked and trimmed to the desired engineered shield shape then stamped to form the curled, rolled or folded shield bead along the edges to form a unitary multilayer metal beaded preform. The beaded preform is substantially flat in overall shape but contains areas in the shape where the layers are in the spaced apart relationship and edge areas where the layers are curled, rolled or folded into a bead. In forming this flat beaded preform the stack need not be trimmed before stamping. The initial stamping of the stack can perform the trimming to shape, forming the edge beads and punching, compressing or otherwise forming as many final or near final features desired in the final shaped shield, such as attache pints, openings for fitting with other parts in the final assembly, e.g., on a vehicle. The substantially flat (or other desired preliminary shape) multilayer metal beaded preforms are then efficiently transported (due to minimal volume) to the final assembly location where they are then stamped into the final three dimensional structural shield shape desired for the final engineered part. The final stamping operation can merely provide shaping to the three dimensional shape by compressing some areas stretching or tensioning some areas while maintaining the spaced apart relationship of the layers in a portion of the part, or can also provide additional punching, cutting or other operation to form the final desired engineered part.

Utility for the forge-formed multilayer metal foil structures of this invention include heat shields and acoustical shields in various applications. For example, the free standing unitary multilayer metal foil structure of this invention is particularly adapted for forming specialty heat shields for automotive use, such as automotive motor mount heat shields, under hood electronic component heat shields, transmission heat shields and the like, where the shielding is from exhaust system heat. Consequently, heat shields formed according to the present invention are lighter in weight, more easily recycled, and, depending on a particular design and end use application, frequently more effective as heat shields than conventional heat shields, which are typically a single layer metal shield or a sandwich construction containing conventional insulation material, such as mineral wool. The stand-alone, rigid unitary multilayer metal foil shield structures of this invention can be directly substituted for such conventional shields. While, the thermal or acoustical performance of the multilayer metal foil structural shields of this invention may be enhanced to some degree by filling the gaps between the metal layers with various insulating materials, this is generally not preferred due to the very effective insulating properties of the multilayer metal foil shields of this invention without such filler materials and due to the increased cost of manufacture and the difficulty in recycling such insulation filled parts. However, in some shielding applications, various additional materials may be desired between certain layers or on the surface of various layers of metal foil. For example, in some acoustic shielding applications a plastic film or layer may be used between the metal foil layers, either over the entire area of the shield or only in certain portions, e.g., the areas where gaps remain between the layers after the shield is shaped and formed. Another example is the use of a film or sheet adhesive or a sprayed on adhesive layer between the metal foil layers or on one or both sides of one or more metal foil layers. In acoustic shield application, such intermediate layers will have sound and vibration damping benefits by preventing metal point contact between the metal foil layers and adding mass for absorbing vibration. This will be especially beneficial in shields having large, substantially flat areas. It will be apparent to one skilled in the art how to select desired materials to enhance the acoustic shielding properties of the multilayer metal foil shields of this invention, recognizing that materials useful for enhancing acoustic shielding performance may not be appropriate for heat shielding applications.

Additional materials that can be used between the metal layers include fiber materials in the form of batts, mats, woven, non-woven, cloth, prepreg lay-ups, or loose blown-in fibers. The fibers can be non-organic like fiberglass, mineral wool or ceramic, or can be organic like polyester, aramid, cellulose (e.g., paper), cotton, wool, corn stalk/silk, flax, DAF, sisal and the like. The material can be a foam (open or closed cell) in layers or pieces, a gel in layers or pieces or an elastomer. Any of these materials can be mixed or layered with one another or with thin metal or plastic foil, e.g., 0.8 mil, in smooth textured, perforated, solid or any other desired form, including corrugated, embossed, expanded mesh, and the like. These materials can be only in the interior of the structure or can be incorporated into the rolled, curled or folded edge portion of the structure. Some material present in the edge portion can be melted, decomposed, thermoset activated by application of heat to the edge portion. Similarly, these materials can be heat treated, set or conditioned by application of appropriate heat to the interior portion of the structure in addition to or instead of the edge portion. These materials used in proper combination with the metal sheet and foil layers can result in designs of any desired thermal, acoustical, structural, environmental, barrier and other properties.

Another unique use for the shaped and formed multilayer metal foil shield structures of this invention is a direct application of these, shields to automotive underbody areas for heat and acoustic shielding, especially by direct attachment to the exterior surface of the floor pan of the passenger compartment of automobiles. For example, the multilayer metal foil structures of this invention can be precisely formed and shaped to fit exactly and uniformly on desired surface portions of the exterior of the bottom pan of the passenger compartment of an automobile. Such shield structures of this invention can be attached to the exterior surface of the floor pan by conventional fasteners, but more preferably by a contact adhesive or mastic material applied uniformly over the surface or in spots across the surface of the shield and the floor pan. The multilayer shield structures of this invention can be formed to exactly fit and mate with the entire bottom of the automotive passenger compartment and made in any size to cover any desired portion of the surface area of the floor pan. Alternatively, the shields of this invention can be shaped and formed in sections, then attached by desired means to portions or selected areas of the automotive floor pan. In either method, the multilayer metal shield structures of this invention provide a light weight, recyclable products which can economically be used for heat and sound shielding for the entire bottom of the automobile passenger compartment.

Similarly, the shaped and formed multilayer metal foil shield structures of this invention can be manufactured to be placed on the engine side of an automobile fire wall, thereby providing heat and sound insulation and shielding for the automotive passenger compartment on an integrated basis. The multilayer metal foil structures of this invention provide light weight recyclable products which can economically provide such heat and sound shielding over large areas, while being structurally strong enough to be attached directly to the automotive component desired, without the need for a separate supporting pan or frame.

The materials used in the multilayer metal foil structures of this invention will obviously depend on the particular use and performance properties required of the product. Typically, aluminum foils will be used for most heat and sound insulation or shielding applications, particularly for the underbody automotive applications and the moderate temperature heat shields such as motor mount shields and other engine compartment or under hood heat shields. In particular, heat shields according to the present invention are useful in shielding electronic and computer components in the engine compartment from engine and exhaust system heat. In other applications, such as exhaust manifold or exhaust down pipe shielding applications, other material such as stainless steel foils will be necessary in order to withstand the temperature environment and meet durability requirements. The selection of particular metal foils for particular application will be apparent to one skilled in the art taking into consideration the temperature environments, the noise and vibration environments, as well as the properties of the metal sheets and metal foils required in order to efficiently shape and form the multilayer metal foil shield structures according to this invention.

Figure 1:
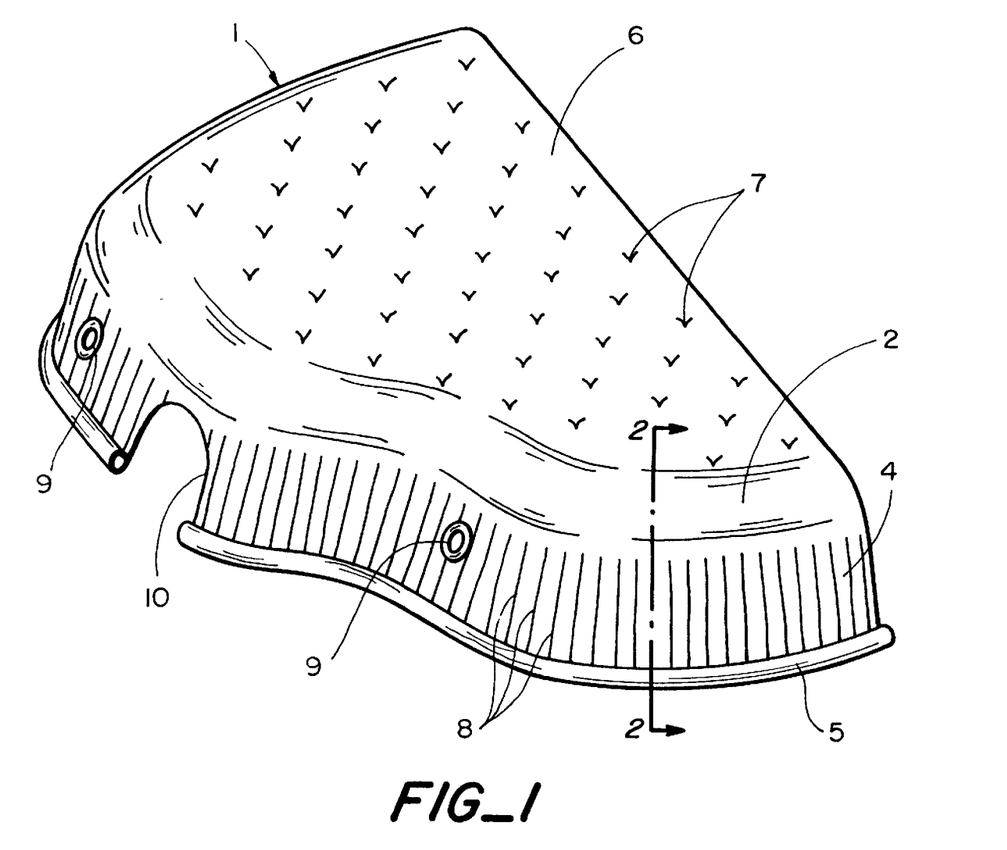
FIG. 1 is a perspective view of a forge formed multilayer metal foil shield according to this invention.

This invention is further illustrated by reference to the drawings. FIG. 1 is an illustration in perspective of an example of a typical multilayer metal foil shield of this invention formed by the method of this invention. The heat shield (1) illustrated in FIG. 1 is formed of five layers of aluminum sheet where the top layer 0.010 in. in thickness, the three interior layers are foils each having a thickness of 0.002 in. and the bottom sheet is aluminum foil having a thickness of 0.005 in. in thickness. The part is formed from a flat preform as referred to above and as illustrated below in FIG. 3B where the preform is a stack of the aluminum sheet layer and the four aluminum foil layers which have been embossed with embossments (7) to provide the gaps between the layers. During the forming of the shield (1) from the preform, the aluminum foils are stretched under tension in corner area (2) as well as compressed to form the corner area (2) extending around area (6). During the forming process, the aluminum foils are compressed together to form wall section (4) wherein the aluminum foils are compressed longitudinally (x and/or y) as well as vertically (z), whereby the aluminum foil layers are gathered and pleated together and folded on top of each other, then compressed whereby the five layers are interlocked together in pleated and folded engagement to form a rigid wall (4) having the pleats and ridges (8) shown in FIG. 1. The edges of the metal foil layers are then curled and rolled to form edge roll (5) along the bottom edge of the wall portion (4) of the shield. Attachment mounts (9) are spot welded into wall section (4), for example see Ragland U.S. Pat. No. 5,524,406, incorporated herein by reference which attachment mounts can be used to bolt the shield to a vehicle for which the part is designed. Mounting points (9) are preferred in wall section (4), but can be placed in any part of the shield, including areas (2) and (6). Cut out area (10) is typical of an automotive part which must be designed to fit around other components adjacent to where the shield is mounted on the automobile.

Figure 2:
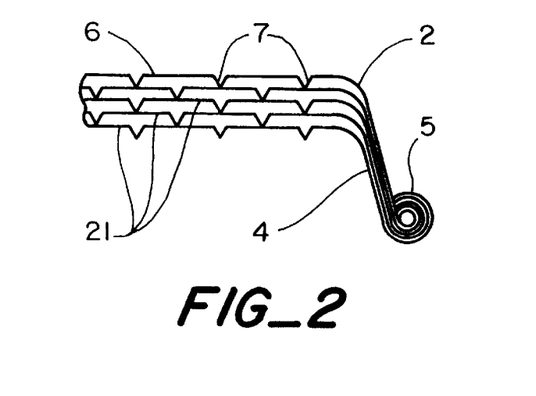
FIG. 2 is a partial cross section of the shield of FIG. 1.

As can be seen in FIG. 1, area (6) of the shield has not been tensioned or compressed and remains substantially in its original preform shape whereby embossments (7) separate and provide gaps between the layers. This can be more clearly seen in FIG. 2, which is a partial cross-section view 2—2 of the shield in FIG. 1. Referring to FIG. 2, the partial cross-section illustrates the metal foil layers (21) having embossments (7) separating the metal foil layers in area (6). In area (2) of the shield, the metal foil layers have been tensioned and stretched during the forming process thereby smoothing and substantially eliminating the embossments in area (2) by tensioning and stretching as well as by compressing during the forming and shaping process. In wall section (4) the metal foils are wrinkled and folded together so that the wrinkles and folds, when compressed on top of each other, interlock at least some and preferably all of the metal foil layers together thus providing a strong multilayer interlocked wall which imparts surprising structural strength to the shield structure. Further, the edge portion of the compressed and interlocked area of the metal foil layers is then curled and formed to create edge roll (5) which further interlocks the metal foil layers and provides further structural strength and rigid dimensional integrity for the shield.

It will be apparent to one skilled in the art that shield (1) in FIGS. 1 and 2 is suitable for use as a free standing structural automotive part, which may be mounted on an automobile directly without need for a supporting pan or frame member. Although the top cover layer of the shield (1) is a 0.010 in. aluminum sheet, and the remaining layers are 0.002 in. and 0.005 in. aluminum foil layers, the five layer aluminum foil formed structure is very strong and is capable of withstanding, even by direct mounting, the structural demands and vibration loads it must endure in automotive use. It will also be apparent to one skilled in the art that the figures illustrating this invention is but one example of an infinite number of three dimensional shapes and forms of multilayer metal sheet and metal foil shields that can be designed and formed from a multilayer preform. The spaced apart area (6), the tensioned or stretched area (2), the wall section (4) and the edge portion (5) can be designed and formed in any desired structural shape for any shielding application, including for example a plurality of each portion or area, even in repeating units of each area, with mounting points (9) positioned as needed. For example, it is not necessary that the entire edge portion be compressed and formed into a roll, some portions of the edge portions of a particular shield structure can be the edge of area (6) where the spaced apart metal foil layers are uncompressed with gaps between the layers at the edge of the shield.

Figure 3A:
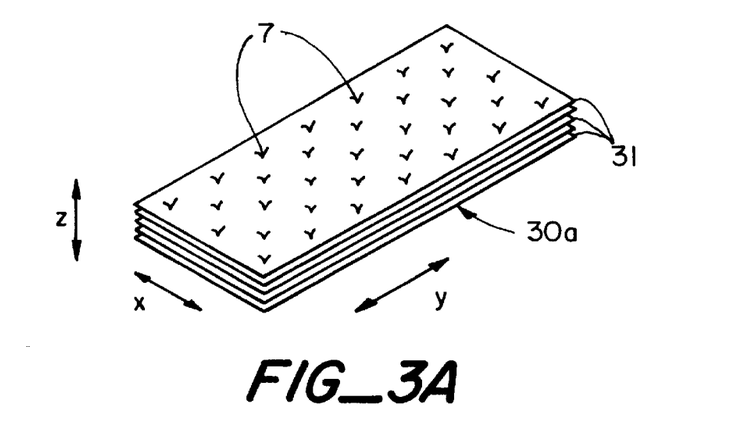
FIG. 3A is an illustration of a multilayer metal foil preform useful in the present invention.

FIG. 3A illustrates in schematic form a preform of embossed metal foil layers positioned in a preform stack suitable for use in the method of the present invention to form the three dimensional shaped products according to this invention. Preform (30a) comprises layers (31) of metal foil having embossments (7) which provide separation of the layers and gaps between the layers. As referred to herein, the compression in the vertical (z) direction is referred to as the compression in the direction normal to the plane of the surface of the metal foil layers. The transverse or lateral (x) and longitudinal (y) directions refer to the directions along the planes of the metal foil layers. It is understood that these vertical, transverse and longitudinal directions referred to herein change and follow the plane and surface of the layer in the preform as it is deformed and shaped into three dimensional shapes. It is also understood that instead of embossments in a preform the metal foil layers may be wrinkled, corrugated, or otherwise processed, deformed or surface treated in order to provide the flexibility and elongation potential as well as compressibility, preferred for best utilization in the shaping and forming of the multilayer metal foil preform according to the present invention. It is also understood that some of the metal foil layers may be embossed, wrinkled or corrugated and other layers may be smooth while still other layers may be separated by other spacers such as foil pieces, foil mesh and the like. Selection of the particular method of forming the individual layers for use in the preform and of forming the gaps between the layers will be apparent to one skilled in the art practicing the presently disclosed invention. In some cases the gaps between the layers may be due to the wrinkles that inherently occur in metal foil sheets during handling and processing.

Figure 3B:
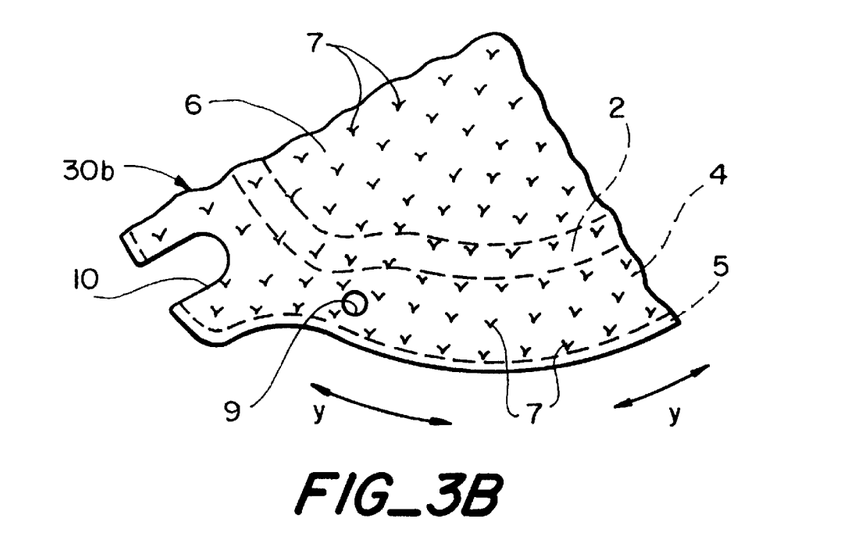
FIG. 3B is a partial top view of the preform utilized in making the shield of FIG. 1.

FIG. 3B is a top view illustration of a portion of the preform (30b) which comprises the stack of aluminum foils and the top sheet utilized to form the shield (1) shown in FIG. 1. In visualizing this preform, it will be apparent to one skilled in the art that area or portion (6) of the preform results in area (6) of shield (1) in FIG. 1 while areas (2) (4) and (5) of the preform also result in and form areas (2) (4) and (5), respectively, in the shield of FIG. 1. For illustration purposes, these areas are arbitrarily delineated in the depiction of the preform (30b) in FIG. 3B by dotted lines, which dotted lines have no other significance than showing which areas of the preform are shaped into corresponding areas of the formed shield (1) of FIG. 1. In comparing the preform of FIG. 3B to the final formed product shield (1) in FIG. 1, it can be seen that area (2) is placed under lateral or longitudinal tension and stretched and also placed to some extent under vertical compression in order to form corner area (2) of shield (1). In another aspect, in viewing the preform compared to the final formed shield it is apparent that areas (4) and (5) in the preform must be compressed longitudinally in direction (y) by pleating, folding or otherwise to gather the excess metal foil material from the large perimeter area (4) and (5) in preform (30b) of FIG. 3B to result in the smaller or shorter perimeter area of wall (4) and roll (5) in the final formed shield (1) of FIG. (1) resulting after the wall (4) area is formed into the three dimensional shape. It is this longitudinal compression in the longitudinal (y) direction during the forming and shaping process which results in the interlocking pleats and folds (8) shown in wall section (4) FIG. 1. The preform shown in FIG. 3B likewise illustrates how the preform can be cut to accommodate mounting points (9) and cutout (10) which then appear in the final formed product shield (1) shown in FIG. 1.

The preform selected for forming and shaping a particular shield or part can be a flat stack of metal sheets, which is then entirely shaped and trimmed to size in a preferred single stroke stamping/forming operation as described above. Alternatively, the preform can be trimmed or cut to size before the forming or stamping. Similarly, the preform can be assembled from individually formed or partially formed sheets that are nested into a partly formed preform then finished to form the multilayer metal structures of this invention. Another example is where the flat stack of metal foils and sheets is trimmed then partially formed in a first forming operation, e.g., roll forming the edge, then finished in a second forming or stamping operation to produce the final multilayer metal foil structure. In the preferred single stroke stamping/forming operation embodiment of this invention, the process is easily adapted to a continuous feed of multiple layers and pre-prepared, e.g., embossed, metal sheets and metal foils into a stamping operation where finished multilayer metal foil three dimensional structural parts are cut and formed from the continuously fed multilayer preform. Such a continuous feed of the preform can also be utilized in forming and stamping of parts where two or more forming steps are performed to produce a finished part.

Figure 4A:
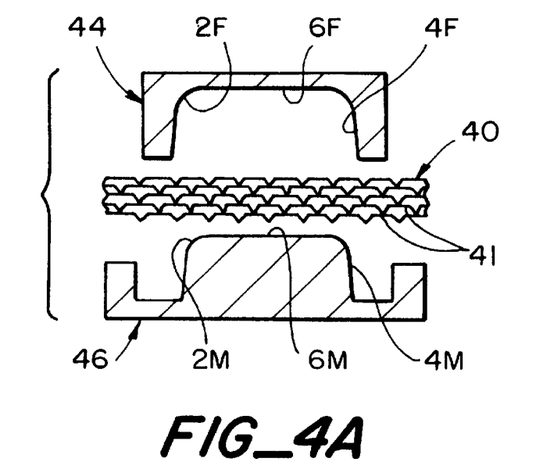
FIG. 4A is an illustration of the molds and preform utilized in the process of forge forming the multilayer metal foil shield products of the present invention.
Figure 4B:
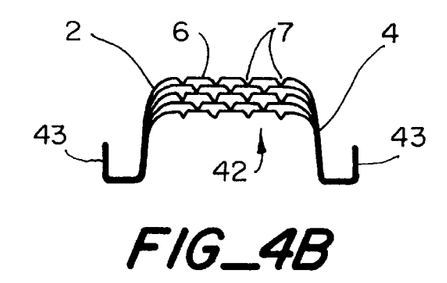
FIGS. 4B and 4C are cross section views of the shield product formed in the molds illustrated in FIG. 4A.
Figure 4C:
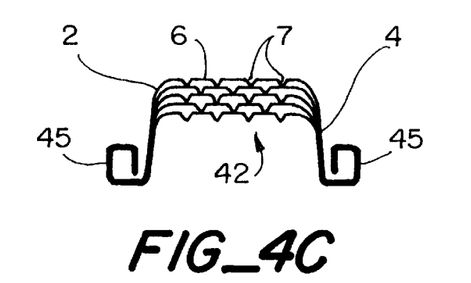

FIG. 4A through FIG. 4D illustrates the process of the present invention for the forming and shaping of multilayer metal foil preforms into three dimensional unitary shield structures. FIG. 4A illustrates the male and female molds (46) and (44) which are used to form the multilayer metal foil preform (40) which comprises embossed metal foil layers (41). When molds (44) and (46) close on the preform (40), the cavity remaining between surfaces (6F) and (6M) when the mold is closed results in area (6) of shield (42) illustrated in FIG. 4B. In area (6), the embossed metal foil layers remain uncompressed and have gaps between the layers. In the mold in FIG. 4A, when surfaces (2F) and (2M) are mated they swage form multilayer metal foil preform (40) such that in areas (2) of shield (42) shown in FIG. 4B, the metal foil layers are stretched and smoothed under longitudinal tension and vertically compressed to form the shoulder area (2) in shield (42). Similarly, when surface areas (4F) and (414) in the mold illustrated in FIG. 4A are mated with the mold closed, they compress and form the wall section (4) of shield (42) in FIG. 4B by wrinkling and interlocking the metal foil layers together in wall area (4). The remainder portions of the molds (44), (46) in FIG. 4A compress and form the edge portions (43) of shield (42) illustrated in FIG. 4B. Edge portions (43) are then folded and compressed to form rigid edge rims (45) illustrated in FIG. 4C. While the illustration in FIG. 4C is for a folded edge portion which can be compressed to form a rigid folded edge rim portion, it is recognized that in many cases it will preferred to form a rolled or curled cylindrical edge, as illustrated in FIGS. 1 and 2. Other forms of folding, rolling, curling, etc. the edge to form the appropriate structural strength along the edge will be apparent to one skilled in the art following She teachings of this invention. It is to be noted also that in areas (2) and (4) of the forge formed shield (42) of FIG. 4B the original embossments, corrugations or deformations present in the preform in those areas are essentially stretched, smoothed, destroyed, flattened or deformed by the forming process, so that the gaps between the metal foil layers are essentially eliminated, especially in area (4). In area (2) the layers may still have gaps to some degree between them, depending on the lateral stretching and vertical compressing applied during the forming and shaping process. The layers in area (2) may be partially spaced apart, mostly smooth layers where the embossments, corrugations, etc. have been pressed or stretched out smooth. In area (4) the gaps between the layers will almost completely be replaced by small pockets or cavities, if any, due to the layers being crushed and folded together then compressed to interlock the layers together.

Figure 4D:
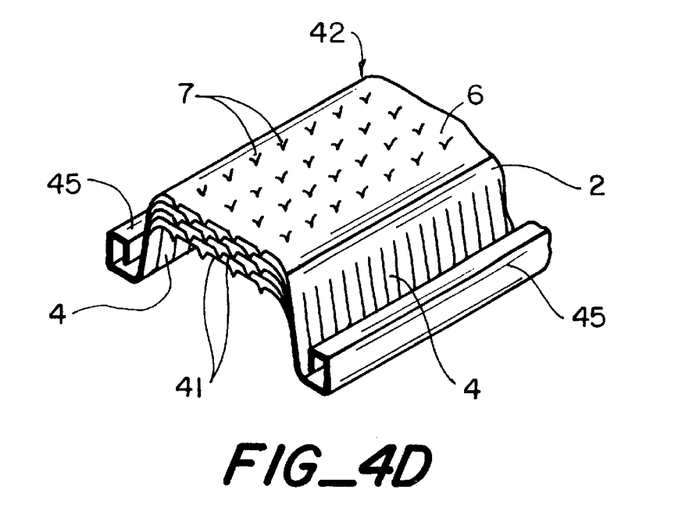
FIG. 4D is a partial perspective view of a shield formed in the method illustrated in FIG. 4A.

FIG. 4D is a partial perspective view of the heat shield (42) illustrated in FIG. 4C wherein area (6) contains the remaining embossments which separate metal foil layers (41) in area (6). Area (2) is the corner area where the metal foil layers have been tensioned and stretched to form the corner area (2) and wall area (4) shows the wrinkles and pleats where the metal foil layers (41) are compressed and interlocked together to form structural wall area (4). The edge folding, crimping or rolling to form edge roll (45) provides added structural rigidity to the formed shield. If desired edge roll (45) can be spot welded at various points to provide added rigidity to the structure and prevent any tendency for the edge to unroll during installation or use. Shield (41) illustrated in FIG. 4D is an example of a type of a forge formed multilayer metal foil shield structure of this invention which can be used on automotive or vehicle exhaust systems underneath the vehicle to shield the passenger compartment from exhaust system heat.

Figure 5A:
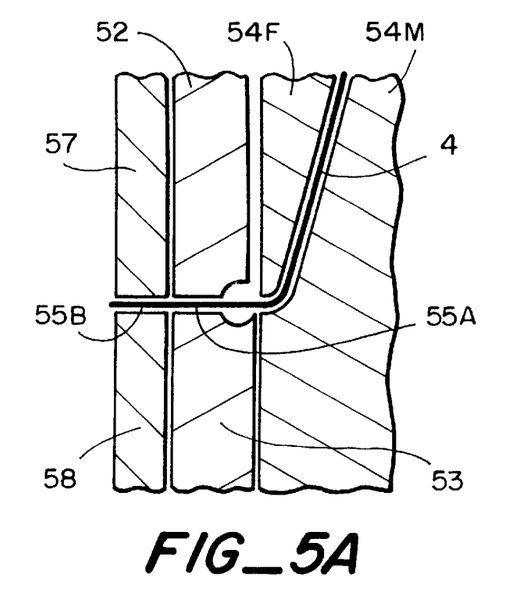
FIGS. 5A, 5B and 5C illustrate a mold configuration and operation for curling the edge of a shield product to form a roll of the multilayer metal foil edge on the shield product such as in a single stroke stamping and forming operation.
Figure 5B:
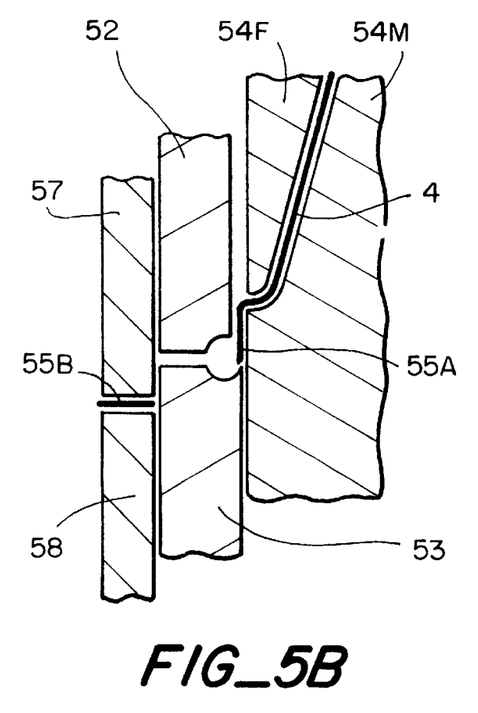
Figure 5C:
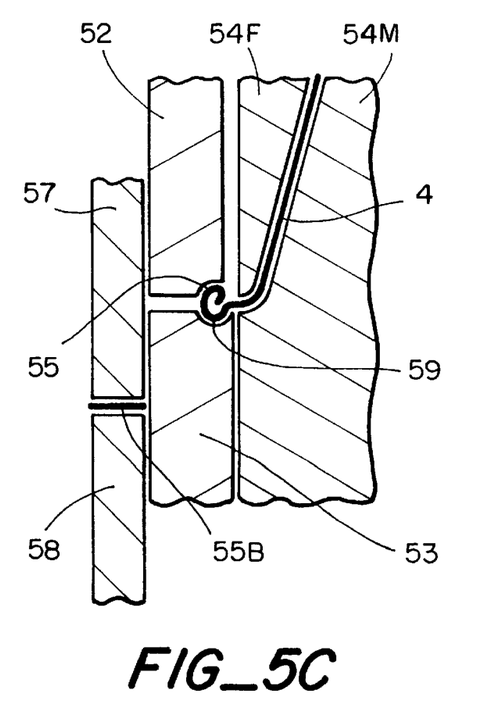
Figure 5D:
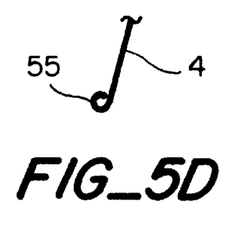
FIGS. 5D, 5E and 5F illustrate the edge roll.
Figure 5E:
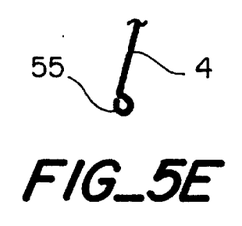
Figure 5F:
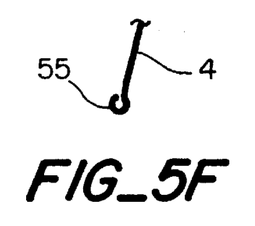

FIGS. 5A, 5B and 5C are an illustration of a preferred mold and a forming and shaping method for forming a rolled edge on the multilayer metal foil structure of this invention by curling the edge using an appropriately adapted portion of the forming mold. FIG. 5A is an illustration of the edge portion of the forming mold where wall portion (4) of a shield structure such as illustrated in FIG. 2 has been formed between the male and female forge mold parts (54M) and (54F) respectively. As illustrated in FIG. 5A, the mold contains peripheral independently moveable parts (52) and (53) and additional independently moveable parts (57) and (58). When the molds initially close, all mold parts (54F), (52) and (57) act in unison, as do mold parts (54M), (53) and (58). After all parts of the mold are closed, wall section (4) is formed and edge sections (55A) and (55B) are formed, then mold parts (57) and (58) are moved separately from mold parts (52) and (53) to shear off from the edge of the multilayer metal foil stack, section (55B) which becomes scrap. This trims edge portion (55A) to the desired length and allows mold portions (52) and (53) to move downward to bend remaining edge portion (55A) to a downward position in the space formed by the clearance existing between mold part (52) and mold parts (54F) and (54M) as illustrated in FIG. 5B. The curling of edge portion (55A) to form edge roll (55) is then performed, as illustrated in FIG. 5C, by closing mold parts (52) and (53) together, then moving the mold parts (52) and (53) in an upward motion. The shaped cavity (59) directs edge portion (55A) in a curling or circular motion to form the edge into cylindrical roll (55) as mold parts (52) and (53) move in the upward direction, stopping at the appropriate point so that the formed edge roll (55) is properly positioned at the bottom of wall (4). The mold is then parted to release the finished part and the scrap piece. FIGS. 5D, 5E and 5F illustrate that the edge roll (55) can be finally formed and positioned relative to wall portion (4) so that edge roll (55) is above, below or inline, respectively, with wall portion (4).

In the molding and shaping method of this invention a preferred aspect is to employ a protective layer between the mold and the multilayer metal sheet preform. The layer can be an evaporating oil, mold release agent or a polymeric sheet, such as polyethylene, which can stay on the formed part until installed, or removed and reused or discarded immediately upon removal of the part from the mold. Similarly, intermediate layers may be used between the metal sheet and metal foil layers to help formability during shaping and molding the multilayer metal sheet/foil preform by assisting the layers to slide or shift on one another. In one embodiment, a spray on or sheet adhesive material can be used for this purpose, then after the part is formed, the part is baked at a temperature to set the adhesive and secure the layers together at most if not all contact points. Such an adhesive reinforced part can provide additional structural strength for stand alone applications and can provide additional acoustic shield performance.

Figure 6:
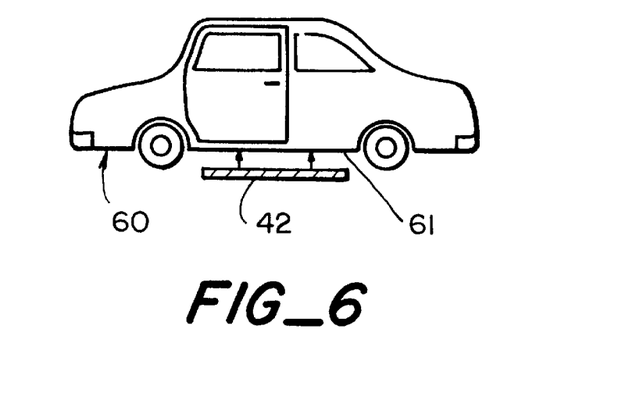
FIG. 6 illustrates the application of a shield according to the present invention to a vehicle.

FIG. 6 is a schematic illustration of the application of a shield (42) illustrated in FIG. 4D to the underbody section of a vehicle (60). Shield (42) can be applied to the underneath surface of the passenger compartment pan or floor (61) by mechanical attachment or by adhesive attachment. It is also to be understood that a shield, such as shield (42) from FIG. 4D as well as any desired shape of multilayer metal foil shield, can be designed and formed or shaped according to this invention to fit any desired portion ol the underbody of a vehicle, or the fire wall or other area of the engine compartment, etc. of a vehicle. The shields made according to the present invention are advantageously attached to the portions of the vehicle by adhesive or other mechanical attachment in order to provide an integral body or chassis part. Because the efficient, light-weight, recyclable shields of this invention can be designed to fit precisely in any part of the vehicle, these shields provide a desired combination of heat shielding and acoustic shielding at any desired location on the vehicle. It is also to be recognized that the direct attachment by mechanical or adhesive attachment of the multilayer metal foil shields of this invention to the desired areas and components of a vehicle is enabled and made possible by the inherent structural strength of the formed multilayer metal foil shields and parts made according to the teaching of this invention.

Figure 7A:
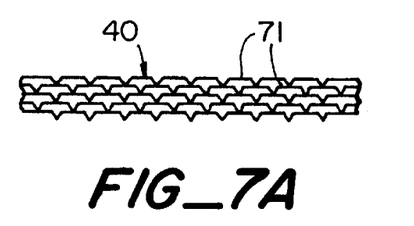
FIGS. 7A, 7B and 7C illustrate the use of intermediate beaded preforms according to the present invention.
Figure 7B:
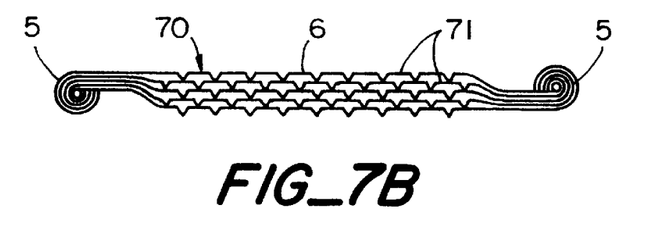
Figure 7C:
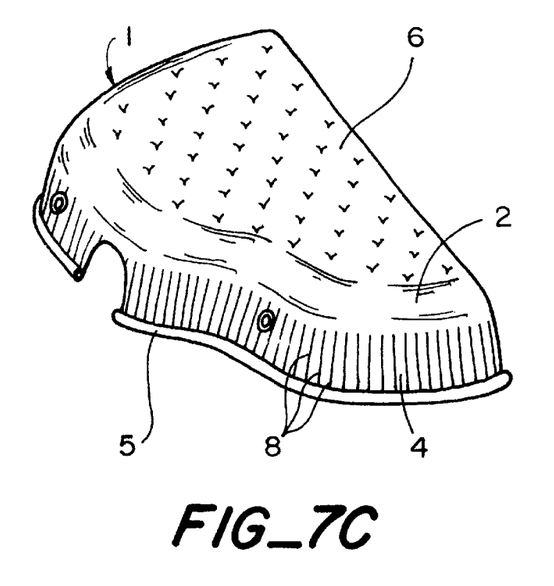

FIG. 7 is a schematic illustration of another aspect of this invention as described above wherein a beaded preform is made as an intermediate product, transported to a final forming or shaping operation and formed into the final desired engineered part. In this practice of the invention, FIG. 7A illustrates multilayer preform (40) comprising spaced apart metal layers (71), which preform (40) can be uncut (see FIG. 3A) or can be cut to a desired shape (see FIG. 3B). Preform (40) of FIG. 7A is then formed into beaded preform (70) illustrated in FIG. 7B and comprising spaced apart layers (71) in area (6) and curled, rolled or folded bead (5) along edge portions in an operation similar to that illustrated in FIG. 5 above. The resulting beaded preform (70) of FIG. 7B can be substantially flat or other desired shape. The main advantage of the beaded preform (70) of FIG. 7B is that the beaded preform can be stored and/or transported, utilizing minimal space or volume, more efficiently than the final full three dimensional engineered part. The beaded preform (70) of FIG. 7B is then formed in a final stamping operation into the final engineered part (1) illustrated in FIG. 7C and comprising spaced apart area (6) compressed or stretched corner areas (2), wrinkled area (4) formed of pleats, folds or ridges (8) and bead area (5). The forming of intermediate preforms, beaded preforms, or partially shaped preforms can be divided into as many forming steps as desired, but the best efficiency of this invention will be realized with the fewest separate forming process steps consistent with the requirements of a particular manufacturing and assembly industry.

It will be apparent from the above disclosure that numerous variations and modifications of the methods of this invention of forming of multilayer metal foil preforms to form structural multilayer metal foil shields, as well as numerous designs and configurations of the resulting formed multilayer metal foil shields of this invention, can be practiced by one skilled in the art without departing from the spirit and scope of the present invention. In this regard, it will be recognized that the selection of the materials for the metal foil layers, the selection of the thicknesses of the various layers, the selection of the number of layers of metal foils, the selection of the methods and configurations for providing the gaps between the layers in the desired area, the selection of the degree to which various portions of the shields are tensile stretched or compressed and interlocked, the selection of materials, if any, to place between the metal foil layers, etc., are all within the skill of one following teachings of this invention. For example, the multilayer metal foil shields according to this invention can contain from three to as many layers as is appropriate for the heat or acoustic shielding requirements for a particular application, taking into consideration the economics of the shield product. However, typically five to nine layers of metal foil will be optimum for many applications. Likewise, the thicknesses of the various metal foil layers will vary from 0.0008 in. to 0.006 in., with the 0.002 in. and 0.005 in. metal foils being preferred for many applications. The top sheets or protective sheets used in conjunction with the metal foils can be any desired thickness which is adaptable to the shaping and forming method of manufacturing the shields according to this invention. It is preferred that top sheets or protective external sheets usually have a thickness of 0.010 in. up to about 0.050 in. for most normal shield applications. Some typical examples of layers used in the formed multilayer metal foil shields of this invention are: (in mils, 1 mil=0.001 in.) 10/2/2/2/5; 5/2/2/2/2/5; 8/2/2/2/4/4/8; 30/4/4/2/2/5; 10/2/2/10; 5/2/2; 10/2/5; and 10/2/0.8/0.8/5. Examples of non-foil metal sheet structures are: 10/8/8/8; 30/10/10/10/

30; 8/8/8 and 50/8/8/10. The materials useful in this invention are most commonly aluminum and stainless steel, but other useful materials will be apparent to one skilled in the art, including copper, tin, galvanized sheet, brass, etc. One skilled in the art can readily select appropriate combinations of materials and metal foil and metal sheet thicknesses for specific use applications, specific forming processes and mold configurations and the particular metals used. The total thickness of the shield or part will depend not only on the number of layers, the thickness of the layers and the gaps between the layers, but on the shapability and formability of the preform or beaded preform to provide the final desired formed and engineered part. Thickness will range from 0.010 in. to 0.25 in. or greater.

It will also be apparent to one skilled in the art following the above disclosure, that shields and parts can be made according to this invention without the use of metal foils, i.e., by using metal sheets greater than 0.006 in. in thickness. Examples of such structures would include 10/7/10; 20/10/10/10; 30/8/8/8; and the like where the layers are selected to provide appropriate forming and shaping using the methods disclosed herein for multilayer metal sheet preforms.

While this invention has been described and illustrated in terms of heat and acoustic shields, it will be apparent that the multilayer metal sheet and foil structures of this invention and the methods of this invention will have various other utilities as well, such as food preparation and serving devices.

We claim:

1. A method of forming a multilayer metal foil structure comprising:

at a first location, forming a bead along at least one edge of a stack of at least three metal layers to form a substantially-flat unitary multilayer metal beaded preform;

transporting the substantially-flat unitary multilayer metal beaded preform to a second location; and at the second location, forming said substantially-flat unitary multilayer metal beaded preform into a three-dimensional shape over a mold, wherein the first and second forming steps are such that the layers are interlocked together and such that in a portion of the formed three dimensional structure, the metal layers have gaps there between.

2. The method of claim 1 wherein at least two of the layers are metal foil having a thickness of 0.006 in. or less.

3. The method of claim 1 wherein interlocking the layers is done by forming the layers in folds, rolls, wrinkles, coils, crimps or curls.

4. The method of claim 1 wherein the preform is provided as a stack of metal foil layers which are embossed, corrugated or wrinkled to provide gaps between the layers.

5. The method of claim 1 wherein the bead is formed by curling, rolling or folding along the at least one edge of the metal layers.

6. The method of claim 1 wherein the substantially flat unitary multilayer metal beaded preform is cut to a desired shape.

7. The method of claim 1 wherein the substantially flat unitary multilayer metal beaded preform includes interlocking corrugations.

8. The method of claim 1 wherein in a first portion of the preform the layers are placed under tensile stress to stretch and shape that portion of the preform stack to form a corner in the desired three-dimensional shape, and in a second portion of the preform the layers are placed under compression to shape a portion of the preform into the three-dimensional shape to impart structural strength to the metal structure by interlocking the layers together.

9. The method of claim 8 wherein the stretching of a portion of the preform to form a corner substantially reduces embossments, corrugations, or wrinkles in that portion of the structure.

10. The method of claim 1 wherein the structure comprises at least four layers of metal foil.

\* \* \* \* \*